No. 724,512. PATENTED APR. 7, 1903.
E. SCOTT.
PUMP PLUNGER.
APPLICATION FILED NOV. 2, 1901.
NO MODEL. 2 SHEETS—SHEET 1.
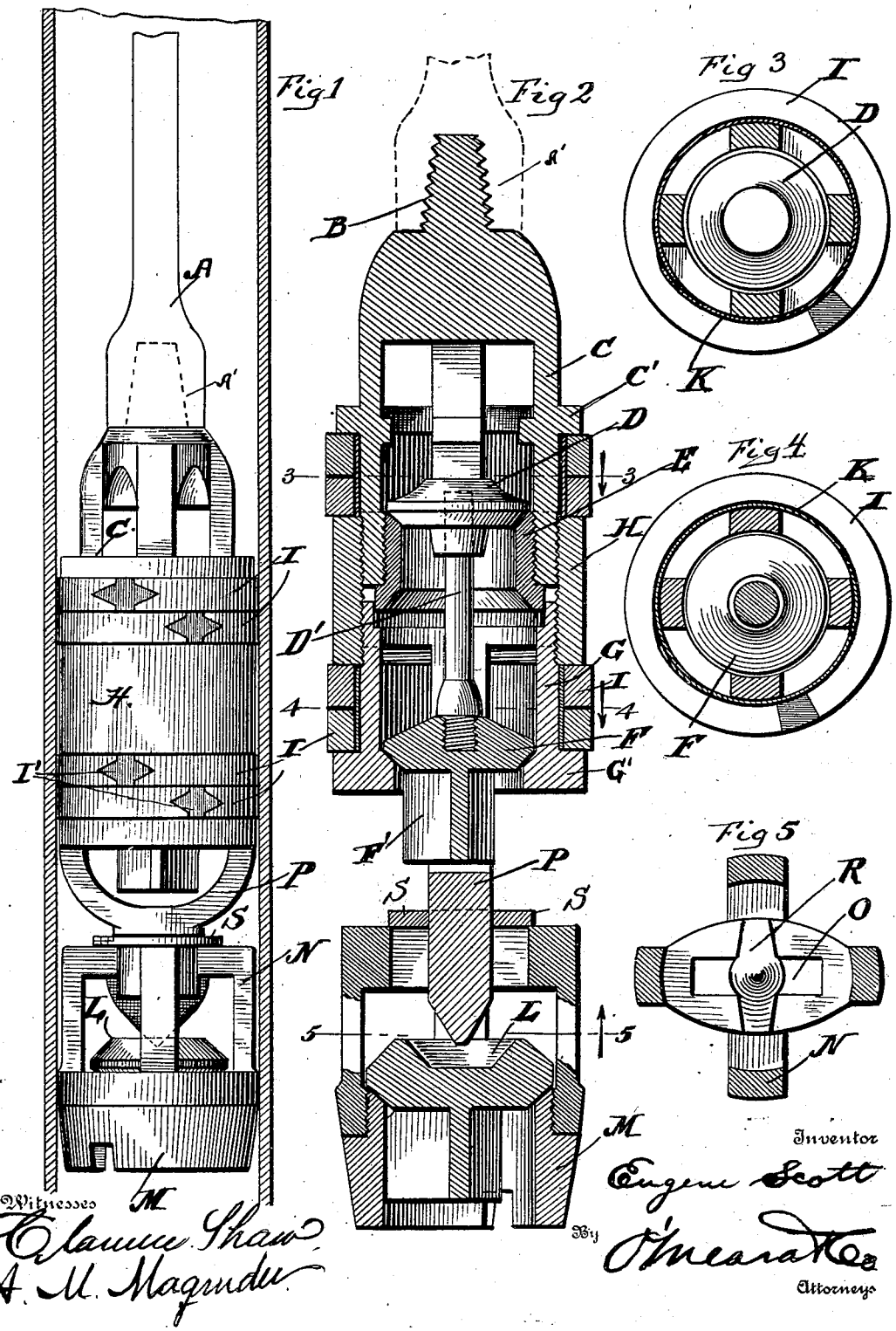

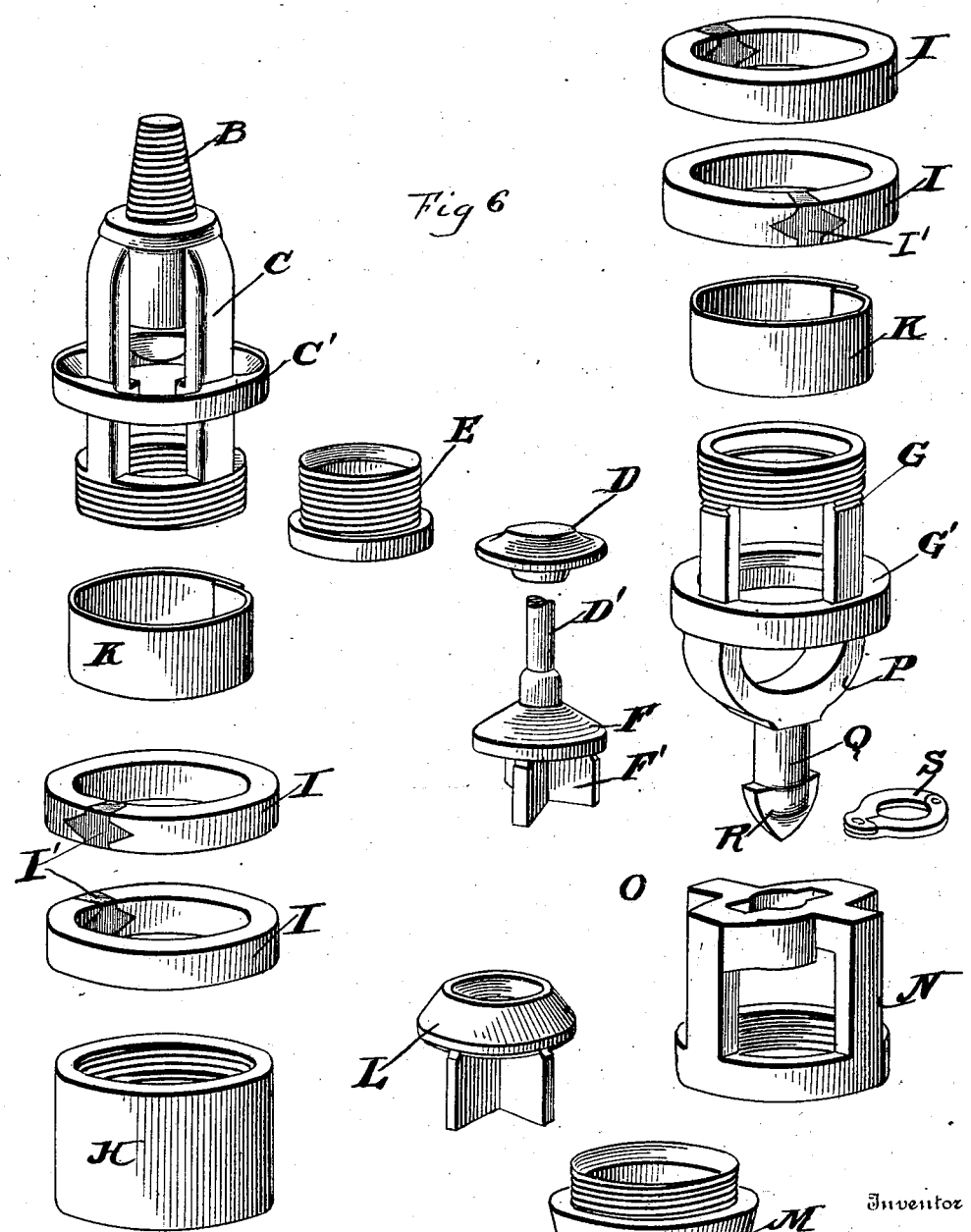

UNITED STATES PATENT OFFICE.

EUGENE SCOTT, OF TOYAH, TEXAS.

PUMP-PLUNGER.

SPECIFICATION forming part of Letters Patent No. 724,512, dated April 7, 1903.

Application filed November 2, 1901. Serial No. 80,950. (No model.)

*To all whom it may concern:*

Be it known that I, EUGENE SCOTT, a citizen of the United States, residing at Toyah, in the county of Reeves and State of Texas, have invented a new and useful Pump-Plunger, of which the following is a specification.

This invention relates to pumps, and more particularly to the plunger-valve mechanism and also to the foot-valve mechanism; and the object of the invention is to provide an improved construction of both plunger and foot-valve mechanisms and also an attachment to the plunger mechanism whereby the foot-valve mechanism can be removed when desired.

With these objects in view the invention consists in the peculiar construction of the various parts and in their novel combination or arrangement, all of which will be fully described hereinafter and pointed out in the claims.

In the drawings forming part of this specification, Figure 1 is a view illustrating the plunger-valve mechanism and lower-valve mechanism coupled together and being extracted from the tube of the well. Fig. 2 is a vertical sectional view of the plunger-valve mechanism, the foot-valve mechanism, and the connections between the two. Fig. 3 is a section on the line 3 3 of Fig. 2. Fig. 4 is a section on the line 4 4 of Fig. 2. Fig. 5 is a section on the line 5 5 of Fig. 2. Fig. 6 is a view illustrating in perspective the several parts of the plunger-valve mechanism, foot-valve mechanism, connections, packing-rings, &c.

In carrying out my invention I employ a plunger-rod A, the lower end of which has a threaded socket A', which screws upon the threaded projection B of the upper cage C, said cage carrying the upper check-valve D, which rests upon the upper-valve seat E, said valve-seat E being screwed into the lower end of the cage C, as most clearly shown in Fig. 2.

F indicates the lower check-valve, which is arranged in the lower cage G, said lower cage being connected to the upper cage by means of a cylindrical coupling H. The lower check-valve F has the stem D' connected thereto, the upper check-valve sliding upon the upper end of said stem D'. The lower face of the valve F is provided with guide-wings F'.

The exterior of the upper case C is provided with a ring C', and the lower cage G is formed with a ring G', and between the cylindrical coupling H and the said upper and lower rings C' and G' are arranged the packing-rings I, said packing-rings being preferably made of composite fabric, the ends being united by means of soft rubber I', secured in the notched ends of the packing-rings arranged in pairs. Each pair surrounds a thin band of copper K, the ends of which overlap, as shown in Figs. 3 and 4, which is interposed between the cage and the said packing-rings. By this construction the thin copper band or diaphragm K is spread by the pressure of the water above the plunger, thereby expanding the packing-rings I and insuring a close fit. The coupled valve construction shown is preferred, because each coöperates to guide the other and in addition each serves to retain the water in the respective chambers above them, and thereby keep the packing-rings dilated, though this is not essential. The foot-valve L rests upon the seat M, which seat has a cage N connected thereto, the upper portion of the cage having an elongated opening O, the center of which is slightly enlarged, as most clearly shown in Fig. 6. The lower cage G has a depending yoke P, from which extends a shank Q, terminating in a head R, which head is adapted to be passed through the opening O and when turned at a right angle to the major diameter of the said opening a coupling will be effected between the said depending yoke and the foot-valve cage, thereby establishing a connection between the plunger-valve mechanism and the foot-valve mechanism. A sectional washer-ring S surrounds the shank Q and serves to take up any lost motion between the depending yoke and foot-valve cage.

It will of course be understood that the foot-valve mechanism is located in the well-tube and the plunger-valve mechanism operates entirely independent of the same. At each operation of the plunger-rod A the upper and lower check-valve will become seated and unseated, thereby pumping the water up the well-tube. Whenever it is desired to remove the foot-valve, plunger-rod A is forced a slight distance downward, the head R passing through the opening O, and by giving the plunger-rod a quarter-turn the plunger-rod mechanism and the foot-valve mechanism are coupled together and both can be drawn out of the tube at the same time.

Having thus fully described my invention, what I claim as new, and desire to secure by Letters Patent, is—

1. The combination with a pump-plunger, of a valve-cage secured to the end of said plunger, an exteriorly-threaded valve-seat secured in said cage, a valve in said cage, a lower valve-cage having a valve-seat formed in its lower end, a valve adapted to seat therein said valve having a threaded socket in its upper portion, a guide-rod threaded on its lower end secured in said socket, and means whereby the upper valve is adapted to slide on said guide-rod.

2. The combination with a pump-plunger, of a valve-cage secured to the plunger and having an exterior annular ring formed on it, packing-rings, the upper packing-ring bearing against the ring of the cage said packing-rings being composed of a composite fabric and having notched ends, a rubber composition filling said notches and connecting the ends of the rings, and a thin flexible metal band having overlapping ends arranged within said packing-rings as and for the purpose specified.

3. In a pump-plunger, the combination with a pump-plunger, of valve-cages, secured to the lower end of the plunger, valves in said cages, the lower valve carrying an upwardly-extending guide-rod and the upper valve being adapted to slide on said rod, an annular metal band having overlapping ends around each cage, two transversely-split rings surrounding said band and an elastic composition between the ends of the rings.

EUGENE SCOTT.

Witnesses:
J. B. GIBSON,
T. R. OWEN.